United States Patent
Kohler et al.

(10) Patent No.: US 7,654,245 B2
(45) Date of Patent: Feb. 2, 2010

(54) METHOD OF OPERATING A SPARK IGNITION INTERNAL COMBUSTION ENGINE

(75) Inventors: Bernd Kohler, Donzdorf (DE); Christoph Lux, Stuttgart (DE); Michael Oechsle, Sindelfingen (DE); Matthias Werner, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/075,791

(22) Filed: Mar. 13, 2008

(65) Prior Publication Data

US 2008/0228378 A1 Sep. 18, 2008

Related U.S. Application Data

(63) Continuation-in-part of application No. PCT/EP2006/007777, filed on Aug. 5, 2006.

(30) Foreign Application Priority Data

Sep. 17, 2005 (DE) ........................ 10 2005 044 544
Nov. 8, 2005 (DE) ........................ 10 2005 053 199

(51) Int. Cl.
*F02B 3/02* (2006.01)
*F02B 3/00* (2006.01)

(52) U.S. Cl. ........................ 123/299; 123/305

(58) Field of Classification Search ................ 123/299, 123/300, 305, 295, 430, 301
See application file for complete search history.

(56) References Cited

U.S. PATENT DOCUMENTS

| | | | | |
|---|---|---|---|---|
| 4,621,599 A | * | 11/1986 | Igashira et al. | 123/300 |
| 4,955,339 A | * | 9/1990 | Sasaki et al. | 123/295 |
| 6,067,954 A | * | 5/2000 | Kudou et al. | 123/299 |
| 6,425,367 B1 | * | 7/2002 | Hiraya et al. | 123/299 |
| 6,467,452 B1 | * | 10/2002 | Duffy et al. | 123/299 |
| 6,491,018 B1 | * | 12/2002 | Duffy et al. | 123/299 |
| 6,691,671 B2 | * | 2/2004 | Duffy et al. | 123/299 |
| 6,705,277 B1 | * | 3/2004 | McGee | 123/299 |
| 7,222,602 B2 | * | 5/2007 | Fukasawa | 123/299 |

(Continued)

FOREIGN PATENT DOCUMENTS

DE 101 32 838 A1 1/2002

(Continued)

*Primary Examiner*—Mahmoud Gimie
(74) *Attorney, Agent, or Firm*—Klaus J. Bach

(57) ABSTRACT

In a method for operating a spark-ignition, direct-injection internal combustion engine, wherein fuel is injected into a cylinder of the internal combustion engine and is ignited by a spark plug as a function of at least the load of the internal combustion engine, a crank angle is determined at which a first amount of fuel is injected into the cylinder during the intake stroke whereby a lean mixture is formed in the cylinder, subsequently, as a function of at least the load of the internal combustion engine, a crank angle is determined at which a second amount of fuel is injected, whereby a mixture cloud, which is richer than the lean mixture is formed in the lean mixture and a third amount of fuel is injected in the form of a stratified injection for forming a locally enriched and ignitable fuel/air mixture in the region of the spark plug close to an ignition time which is then ignited by the spark plug causing also combustion of the mixture cloud and the lean mixture.

28 Claims, 4 Drawing Sheets

U.S. PATENT DOCUMENTS

| | | | |
|---|---|---|---|
| RE40,144 E * | 3/2008 | Duffy et al. | 123/299 |
| 7,350,504 B2 * | 4/2008 | Yasunaga et al. | 123/406.47 |
| 2003/0089333 A1 * | 5/2003 | Duffy et al. | 123/299 |
| 2004/0129245 A1 * | 7/2004 | Hitomi et al. | 123/299 |
| 2006/0124104 A1 * | 6/2006 | Altenschmidt | 123/299 |
| 2007/0023006 A1 * | 2/2007 | Takeda et al. | 123/305 |

FOREIGN PATENT DOCUMENTS

| | | |
|---|---|---|
| EP | 1 108 876 A2 | 6/2001 |
| GB | 2 351 816 A1 | 1/2001 |
| WO | 2004/072461 A | 8/2004 |

* cited by examiner

METHOD OF OPERATING A SPARK IGNITION INTERNAL COMBUSTION ENGINE

This is a Continuation-In-Part Application of pending International patent application PCT/EP2006/007777 filed Aug. 5, 2006 and claiming the priority of German patent applications 10/2005 044 544.6 filed Sep. 17, 2005 and 2005 053 199.7 filed Nov. 8, 2005.

BACKGROUND OF THE INVENTION

The invention relates to a method for operating a spark-ignition, direct-injection internal combustion engine based in particular on the 4-stroke principle. The invention also relates to a method for the cold-running operation of a spark-ignition, direct-injection internal combustion engine which operates in particular on the 4-stroke principle.

In motor vehicles, in particular in passenger vehicles, use is widely made of spark-ignition internal combustion engines which are also referred to as Otto engines. Internal combustion engines of said type are increasingly provided with injectors, by which fuel is directly injected into the cylinders of the internal combustion engine. With fresh air which is sucked into the cylinders, a fuel/air mixture is generated which is ignited at a predefinable ignition time by means of a spark plug in order to initiate a combustion.

In conventional operating methods of internal combustion engines of said type, a distinction is made between two main operating modes. At high loads, the engine is operated in the so-called homogeneous mode, in which the entire fuel mass is injected during the intake stroke of the engine and is distributed uniformly in the combustion chamber until the ignition time. The same fuel/air ratio prevails in the entire combustion chamber, which fuel/air ratio should, for reasons of exhaust-gas purification, be at least approximately stoichiometric.

At low loads, direct-injection Otto engines can be operated in the so-called stratified mode. In a direct-injection Otto engine with a jet-controlled combustion process, the entire fuel mass is injected immediately before the ignition time in order to generate a defined injection jet in the region of the spark plug. At higher loads, however, the particle emissions in the stratified mode increase drastically, since the fresh mixture in the region of the spark plug becomes very rich, although the fuel/air ratio averaged over the entire cylinder volume remains considerably lean. The so-called soot limit, that is to say the load at which the particle emissions of the engine become unacceptably high, creates a limitation, in the direction of high loads, of the load range which is possible in the stratified mode in the direct-injection Otto engine.

Since, in the stratified mode, the engine is operated with a very high excess of air, very low exhaust-gas temperatures can be generated at low loads. This leads to problems in the usual exhaust-gas purification methods with oxidation or 3-way catalytic converters, since the catalytic converter temperature can fall below the limit temperature of the catalytic converter, also referred to as the light-off temperature, below which the catalytic converter is no longer effective. The catalytic converter is in this case no longer capable of oxidizing carbon monoxide or unburned hydrocarbons to form carbon dioxide. This makes it necessary for measures to be taken to heat the catalytic converter, for example by switching to the homogeneous mode. However, this results in a considerable increase in consumption, and the loss of a part of the fuel saving potential of the direct-injection Otto engine.

In addition, in order to save fuel and in order to reduce pollutant emissions, an operating mode of the internal combustion engine with a high excess of air or with a high content of inert gas is sought. The latter is for example obtained by means of exhaust-gas retention or exhaust-gas recirculation into the cylinder interior space. In this way, the engine can be operated with higher charge masses or higher intake pipe pressures, which leads to a reduction in throttling losses in the homogeneous mode and therefore to a reduction in fuel consumption. By means of a high inert gas content in the combustion chamber, the combustion chamber temperature can be reduced and therefore the formation of nitrogen oxides during the combustion can be reduced. The range in which the engine can be operated with high inert gas contents is however limited by the running smoothness, which decreases drastically in the conventional homogeneous mode with increasing inert gas proportion.

A further problem in conventional operating methods of an Otto engine lies in the cold start and the subsequent cold-running phase. Direct-injection Otto engines are operated in the homogeneous mode in particular at low temperatures below freezing. Since the combustion chamber walls are still very cold after the cold start, large quantities of the fuel which is injected in the intake stroke accumulate on the combustion chamber walls and on the piston head. Said fuel which is not encompassed by the combustion leads to large quantities of unburned hydrocarbons and particle emissions.

A coordinated, operating-point-dependent switch between the previously known homogeneous and stratified injection methods leads, in the switchover phase, to further efficiency losses or to an increase in pollutant emissions.

It is the object of the invention to provide a method for operating a spark-ignition, direct-injection internal combustion engine with reduced fuel consumption and reduced pollutant emissions over a widened range.

It is a further object of the invention to provide for the cold-running operation of a spark-ignition internal combustion engine in which, in connection with good running smoothness and low emissions values, fast heating of the exhaust-gas catalytic converter is achieved.

SUMMARY OF THE INVENTION

A method is proposed in which, in a first method step, as a function of at least the load of the internal combustion engine, a crank angle is determined at which a first injection of fuel takes place, by means of which a lean mixture, whose local air ratio is greater than 1.0, is generated in the cylinder. Subsequently, as a function of at least the load of the internal combustion engine, a crank angle is determined at which a second injection of fuel takes place, by means of which a mixture cloud, which is richer than the lean mixture and which is embedded in the lean mixture and whose local air ratio is less than 1.0 or equal to 1.0, is generated in the cylinder. Subsequently, a third injection of fuel in the form of a stratified injection for generating a locally enriched and ignitable fuel/air mixture in the region of the spark plug takes place preferably close in terms of time to an ignition time.

In the proposed method, a rich mixture cloud is generated at the spark plug at the ignition time despite a high overall excess of air. In addition, optimum ignition conditions are ensured at the injection time as a result of the formation of a defined injection jet of the third injection. This results in a reliable ignition of the fresh mixture. The running smoothness is very good even under difficult ancillary conditions such as high inert gas content, a high excess of air in the combustion chamber or low combustion chamber temperatures (cold start operation). It is made possible, by skillful selection of the injection times, to operate the engine with fuel/air ratios in the range between stoichiometric ($\lambda=1$) and very lean ($\lambda>4$). The high excess air with lean operation results in an increased intake pipe pressure. As a result of the higher intake pipe pressure, on the one hand, throttling losses are reduced, which leads to a reduction in fuel consumption. In this way, it is possible during operation of the engine with a high excess of air to obtain the same consumption values as in the stratified mode. On the other hand, the proposed method permits, as a result of the high intake pipe pressure with operation with a high excess of air, a fast switching of operating modes, since it is not necessary, during the switchover from the stratified mode to the proposed operating mode, for the intake pipe to be evacuated first, as would be necessary during the switch to the conventional homogeneous mode.

It is additionally made possible to operate the engine with high inert gas masses in the combustion chamber. As a result of the targeted placement of the fuel in the combustion chamber, it is possible to increase the inert gas compatibility of the engine. As a result of a greater inert gas quantity, which can be introduced into the combustion chamber either by means of suitable camshaft positions or else by means of external exhaust-gas recirculation, it is possible to obtain a considerable reduction in throttling losses and therefore in fuel consumption.

The proposed method can also be utilized to prevent intense wetting of the cold combustion chamber walls and of the cold piston head after a cold start at low temperatures, since the first injection of the lean mixture allows only small fuel quantities to come into contact with the cold engine parts. As a result of the reduction in the first injection quantity, less fuel precipitates on the cold components. This results in a drastic reduction in the emissions of unburned hydrocarbons, since only little fuel is precipitated on the cylinder walls and is not encompassed by the combustion but rather discharged unburned into the outlet duct.

In one advantageous refinement, the three injections are carried out in at least approximately the entire load range of the internal combustion engine. An operating mode switch is not necessary. An adaptation to the different load conditions rather takes place merely by selecting different injection times and quantities.

At low engine load, the first and the second injection preferably takes place in each case as a stratified injection in a compression stroke. The first injection is advantageously carried out at a crank angle of approximately 70° before ignition top dead center and the second injection at a crank angle of approximately 30° before ignition top dead center. On account of the lower load, the first injection quantity can be kept comparatively low. As a result of the injection in the compression stroke, a homogeneous distribution over the entire cylinder volume, and therefore an impermissible leaning which adversely affects combustibility, is avoided. The second injection in the compression stroke taking place a relatively short time before the ignition time ensures that the fuel is contained centrally in the region of the spark plug. The third injection in the form of a stratified injection in the direct vicinity of the ignition time ensures reliable ignitability, which propagates from there via the richer mixture cloud to the lean mixture.

At medium and/or high engine load, the first injection advantageously takes place as a homogeneous injection in an intake stroke, and the second injection as a stratified injection in the compression stroke. At medium loads, injection times have been proven to be advantageous at which the first injection begins at a crank angle of approximately 300° before ignition top dead center and the second injection begins at a crank angle of approximately 60° before ignition top dead center. At higher loads or at full load, the first injection expediently begins at a crank angle of approximately 300° before ignition top dead center and the second injection begins at a crank angle of approximately 180° before ignition top dead center. Depending on the load applied to the internal combustion engine, said injection times can be merged into one another in any desired manner and continuously.

At medium and in particular at high loads, it must be ensured, in contrast to operation at low loads, that the fuel introduced into the combustion chamber by means of the first and the second injection is sufficiently well mixed with the fresh air in order to prevent an excessively rich combustion and therefore high particle and carbon monoxide emissions. As a result of the injection of the first fuel quantity in the intake stroke, it is possible here to inject a greater fuel quantity, which is required for the higher loads, without generating local excessive enrichment. The residual quantity of fuel, which is required for the provided overall quantity, is added in the second and the third injection. The mixture cloud generated here also has a high, but not excessively rich fuel/air mixture, which permits reliable ignition without excessive particle emissions. The third injection, which ensures reliable ignition even under extreme operating conditions, takes place in approximately the same manner as at low loads. As a result of the higher combustion chamber pressure at higher loads, the injection quantity can possibly be slightly increased, since greater fuel quantities can be necessary for jet formation at higher combustion chamber pressures.

The air ratio of the lean mixture is advantageously selected such that a combustible but non-ignitable fuel/air mixture is generated. This contributes to a reduction in consumption and pollutants. Despite the fact that ignitability cannot be obtained by means of the spark plug, reliable ignition is nevertheless ensured by means of the embedded, richer mixture cloud, and therefore smooth engine running is ensured even under extreme operating conditions such as a high excess of air or a high inert gas content.

The air ratio of the richer mixture cloud is preferably selected such that a combustible and ignitable fuel/air mixture is generated, but without generating excessive particle emissions. After ignition of the mixture cloud has taken place, the flame front propagates from here to the lean mixture, and burns the latter also.

In one preferred embodiment, the injection quantities of all three injections are coordinated with one another in such a way that the generated global air ratio averaged over the cylinder volume is in a range from approximately 1.0 inclusive to approximately 4.0 inclusive or even higher. Alternatively, or in combination with this, it can be expedient to provide a correspondingly high proportion of inert gas at the beginning of the combustion for example by means of exhaust-gas recirculation or retention. Low fuel consumption and low emissions values can be obtained over a wide operating range.

In one advantageous refinement, at least one of the injections is carried out as a multiple injection, in particular as a double or triple injection.

In a corresponding injector, for example an injector of piezoelectric design, it is possible for one or more of said three injections to be split into short partial injections which are only a few milliseconds long. This permits precise adaptation of the charge stratification to the respective load situation. If the third injection is performed as a multiple injection, it is possible for the ignition time to be positioned between two short individual injections and to thereby influence the ignitability and flame propagation.

In contrast to the first two injections, whose time is selected as a function of the crank angle, the time of the third injection is advantageously coordinated with, or coupled to, the ignition time. With the adjustment, which is selected primarily in a rotational-speed-dependent fashion, of the ignition time and of the time, which is coupled thereto, of the injection, it is ensured that the injection jet of the third injection is always encompassed by the spark at different ignition times. Reliable ignition is ensured at different rotational speeds and ignition times, and results in reliable ignition also of the fuel quantities of the second and first injection.

An injection end of the third injection preferably lies in the region of the ignition time, and in particular between 0° inclusive and 10° inclusive crank angle before ignition top dead center. Said range has been proven to be advantageous for reliable ignition and subsequent combustion.

Overall, it is possible by means of the method according to the invention to obtain a saving of fuel by operating the direct-injection Otto engine with a high excess of air or high inert gas quantities by reducing throttling losses. This results in an expansion in the operating range of the internal combustion engine in which the direct-injection Otto engine can be operated with an excess of air with acceptable pollutant emissions. In contrast to conventional stratified operation in the direct-injection Otto engine, it is made possible to freely select the ignition time and throttling in order to avoid catalytic converter cooling on account of excessively low exhaust-gas temperatures. After a cold start at extremely low temperatures, reliable operation is possible with reduced particle, carbon monoxide and hydrocarbon emissions. The highly unthrottled operation permits a fast switch-over of the operating mode. The inert gas in the combustion chamber leads to a considerable reduction in the combustion temperature. In any case, a hot combustion is generated only very locally at the spark plug. In this way, it is also possible to obtain consumption advantages as a result of fewer regenerations of the $NO_x$ storage catalytic converter being necessary. An improvement in running smoothness during operation with an excess of air can also be obtained as the gradients of the combustion chamber pressure are reduced as a result of a slower combustion than in conventional stratified operation.

The exhaust gases which are generated can however contain pollutants which, without aftertreatment measures, cannot meet relevant regulations. Under certain operating conditions, the fuel/air mixture present in the cylinder is not fully burned. The exhaust gas which is generated contains proportions of hydrocarbons, carbon monoxide and nitrogen oxides, for the conversion of which into environmentally compatible substances an exhaust-gas catalytic converter is arranged downstream in the exhaust system. The effectiveness of the exhaust-gas catalytic converter is dependent on its operating temperature, and said first becomes effective only above a threshold temperature, the so-called light-off temperature.

Only poor mixture preparation can be obtained in the cold cylinder or combustion chamber of the internal combustion engine during a cold start and in the subsequent cold-running operation. The exhaust-gas catalytic converter which is likewise still cold or not sufficiently heated cannot convert, or can convert only to an insufficient degree, the high hydrocarbon emissions and carbon monoxide emissions which are generated.

During a cold start and in the subsequent cold-running operation, it is sought firstly to obtain smooth engine operation despite the cold engine components, and secondly to obtain fast heating of the exhaust-gas catalytic converter. In conventional operating methods, for this purpose, the engine is operated after the cold start with a rich charge mixture in order to ensure sufficient ignition reliability and therefore acceptable running smoothness. A later ignition time is sought, the late position of which is however limited by the ignitability and therefore the smooth engine running. The rich mixture leads to high proportions of unburned hydrocarbons in the exhaust gas, which can be utilized for heating the still cold exhaust-gas catalytic converter. In connection with a secondary injection of air, it is possible for a thermal post-combustion to take place, the reaction heat of which heats up the exhaust-gas catalytic converter. Disadvantageous here are the necessary use of an electrically operated secondary air pump or a secondary air charger, and a plurality of electric and pneumatic switching valves. The functioning of said components must be diagnosed in a complex manner. Emission values and running smoothness are not satisfactory.

The objects are also achieved by a method in which firstly, in an intake stroke of the internal combustion engine, a first injection of fuel takes place as an intake stroke injection. Here, a lean, combustible but non-ignitable fuel/air mixture is generated in the cylinder. The lean fuel/air mixture which fills the entire cylinder volume provides a sufficient supply of oxygen molecules for the post-oxidization. As a result of the low injection quantity into the fresh charge which is cold during the intake stroke, the accumulation of fuel on the cold combustion chamber walls and on the cold piston head is considerably reduced. The hydrocarbon emissions which result from such accumulated and unburned fuel quantities are reduced.

In a compression stroke which follows the intake stroke, a second injection of fuel is carried out as a compression stroke injection, in which a combustible and ignitable fuel/air mixture is generated in the cylinder. This ensures fast and reliable combustion. As a result of the considerably higher cylinder temperatures in the compression stroke, the fuel injected in the compression stroke is considerably better prepared. This has the result, despite the rich mixture, that barely any fuel is accumulated on the combustion chamber walls and on the piston head. As a result of the rich combustion, a large quantity of carbon monoxide and hydrogen, which contain large quantities of chemical energy for heating the exhaust-gas catalytic converter, is provided for the post-reaction in the outlet duct.

Subsequently, a third injection of fuel in the form of a stratified injection for generating a locally enriched and ignitable fuel/air mixture in the region of the spark plug takes place at least close in terms of time to an ignition time. The injection quantity, which is comparatively low here, in the form of a defined injection jet ensures reliable ignition at the edge regions of the jet. From there, the flame front propagates rapidly into the rich charge layer in the region around the spark plug which was generated by the compression stroke injection.

Since the combustion speed rises with falling air ratio, the fast combustion of the rich mixture of the stratified charge formed from the second and third injection ends before the opening of the outlet valve. The flame front of the combustion continues, during the further course of the working stroke, into those regions of the combustion chamber in which the lean mixture of the intake stroke injection is present. The combustion speed is reduced considerably because of the high air ratio present here, and has therefore not yet ended when the outlet valve opens. In this way, very high exhaust-gas temperatures are obtained in the outlet duct and upstream of the exhaust-gas catalytic converter which is connected downstream.

As a result of the combustion of the rich mixture of the stratified injections, a large quantity of carbon monoxide and hydrogen are generated which, in the discharge phase, are post-oxidized together with partially still unburned hydrocarbons from the lean regions by means of the prevailing excess of oxygen.

The low air ratio prevailing in the region of the spark plug permits a comparatively late setting of the ignition time without adversely affecting the ignitability. In this way, it is possible to generate a high exhaust-gas temperature, since the late ignition time results in a late center of the combustion process and a late combustion end. Said boundary conditions in connection with the high exhaust-gas temperatures and the slight excess of oxygen promote a post-oxidization of carbon monoxide, hydrogen and hydrocarbons in the exhaust-gas system, which takes place as a thermal post-combustion both in the outlet duct and exhaust-gas manifold and also in the exhaust-gas catalytic converter which is connected downstream. The reaction heat which is released here brings about a further rise in the exhaust-gas temperature. The high exhaust-gas temperature and the oxidation of carbon monoxide and hydrocarbons in the catalytic converter itself ensure accelerated heating of the exhaust-gas catalytic converter which, as a result, reaches its light-off temperature already after a few seconds.

The intake stroke injection is preferably carried out in such a way that an at least approximately stoichiometric fuel/air mixture is generated in the cylinder. Unavoidable condensation quantities of fuel on cold engine parts are reduced, while a uniform propagation of the flame front in the following combustion is ensured. Here, a preferred air ratio of approximately 1.6 has proven to be expedient.

The compression stroke injection is preferably carried out in such a way that, within the homogeneous fresh charge, a mixture cloud is formed which is richer than said homogeneous fresh charge and which is embedded into the lean homogeneous fuel/air mixture. The richer mixture cloud preferably has an air ratio of less than or equal to 1.0, as a result of which a high level of ignitability and a locally limited fast combustion is ensured.

The global air ratio averaged over the cylinder volume and generated from all the injections is advantageously in a range from approximately 1.0 inclusive to greater than 1.0, and is in particular between 1.0 inclusive and 1.05 inclusive. Sufficient oxygen is present for heating the exhaust-gas catalytic converter which is connected downstream and the thermal post-combustion, which is provided for this, in the exhaust strand, as a result of which an additional air supply by means of a secondary air pump or secondary air charger is no longer necessary. The construction, control and regulating expenditure is reduced.

In one expedient refinement, the intake stroke injection and/or the compression stroke injection and/or the stratified injection is carried out as a multiple injection, in particular as a double or triple injection. By means of suitable injectors, for example of piezoelectric design, the fuel quantities which are to be injected in said three injections in each case are split into partial quantities which, individually, are injected into the cylinders within a few milliseconds. The homogenization of the intake stroke injection, the shape and the stratification of the mixture cloud generated by the compression stroke injection and the ignition conditions at the spark plug during the stratified injection can be adapted in a defined manner.

The time of the intake stroke injection and of the compression stroke injection is advantageously coupled to the crank angle of the crankshaft, and therefore in terms of time to the respective state of the process stroke, with it having been proven to be expedient for the intake stroke injection to take place at a crank angle of approximately 260° before ignition top dead center and for the compression stroke injection to take place at a crank angle of approximately 30° before ignition top dead center.

The stratified injection is, in contrast, preferably coordinated with the ignition time. Under different load and in particular rotational speed conditions, the ignition time is varied, and with it also the time of the stratified injection. It is ensured that, at different injection times, the stratified injection which is coordinated therewith ensures reliable ignition of the cylinder charge.

In order to generate the above-described boundary conditions of fast catalytic converter heating, the ignition time expediently lies after ignition top dead center and in particular in a crank angle range of 0° to 35°, preferably from 15° to 30° after ignition top dead center. The injection end of the stratified injection expediently lies in the region of the ignition time, and preferably between 0° and 10° inclusive crank angle before ignition top dead center. It is possible, with reliable ignition, to obtain fast heating of the exhaust-gas catalytic converter.

In a further preferred refinement, the injection quantities of the compression stroke injection and/or of the stratified injection are controlled or regulated by means of a control unit as a function of the attained operating temperature of the exhaust-gas catalytic converter. Control or regulation of the respective times can also be expedient. With rising temperature of the exhaust-gas catalytic converter and as the latter comes into effect, the exhaust-gas values can be minimized and the overall efficiency of the internal combustion engine can be improved.

The invention will become more readily apparent from the following description of preferred exemplary embodiments of the invention described below with reference to the accompanying drawings:

DESCRIPTION OF THE VARIOUS EMBODIMENTS

Figure 1:
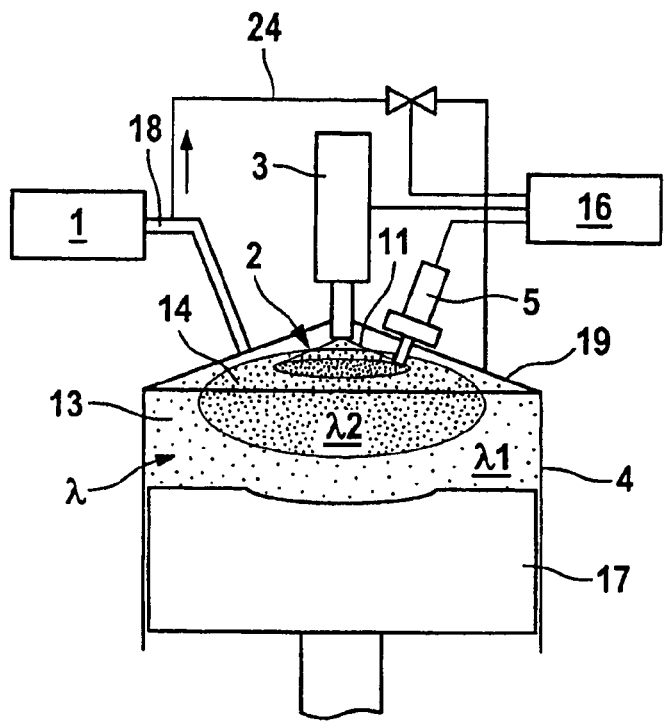
FIG. 1 shows schematically a first embodiment of an internal combustion engine in the region of a cylinder with an injector, a spark plug and a control unit, with the cylinder being filled, as per the method according to the invention, and at part load, with a different fuel/air mixture in different regions.
Figure 2:
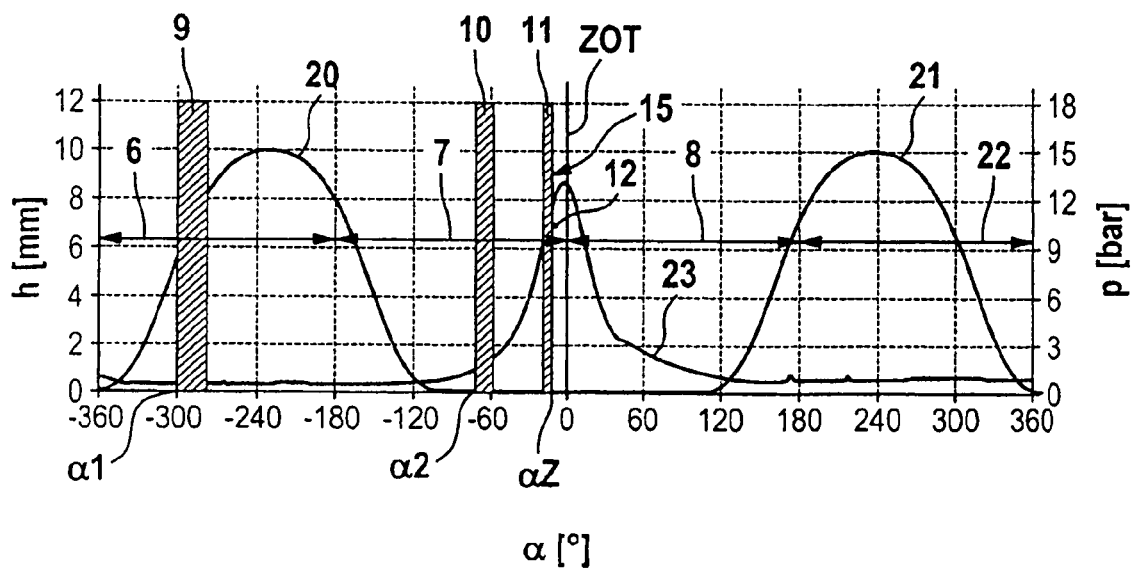
FIG. 2 is a diagrammatic illustration of the injections which are provided according to the invention at different crank angles in the arrangement as per FIG. 1 at part load.
Figure 3:
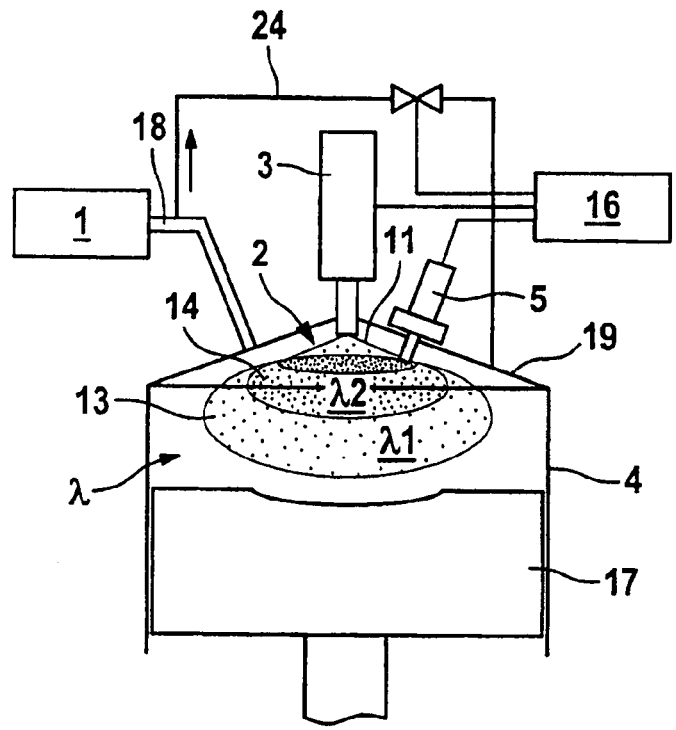
FIG. 3 shows the arrangement as per FIG. 1 in a low load range wherein fuel quantities are injected in each case as a stratified injection.
Figure 4:
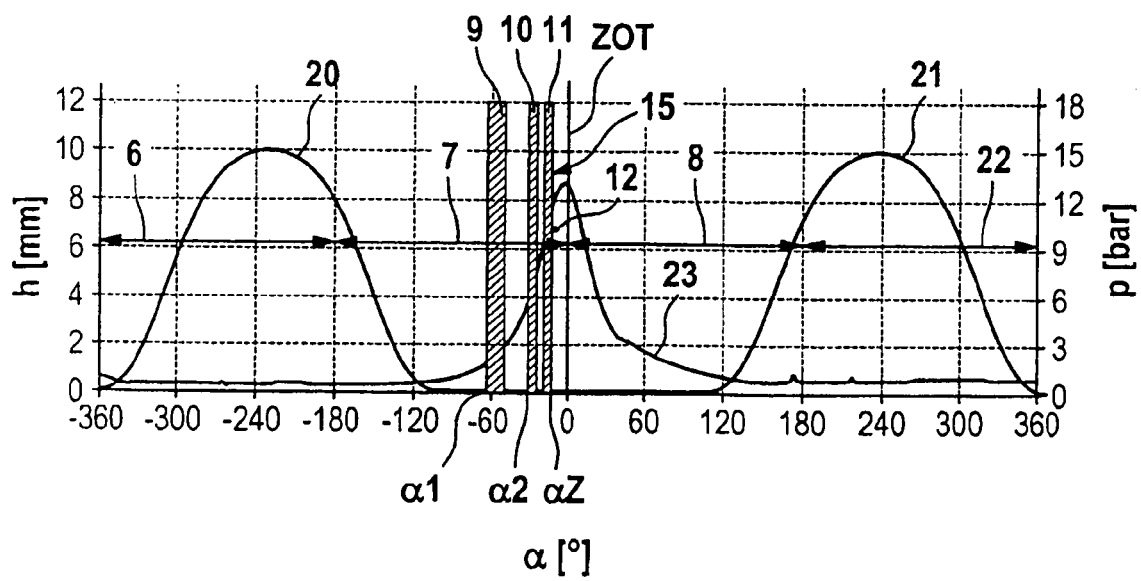
FIG. 4 is a diagrammatic illustration corresponding to FIG. 2, illustrating the individual injections in the internal combustion engine as per FIG. 3 at low load.
Figure 5:
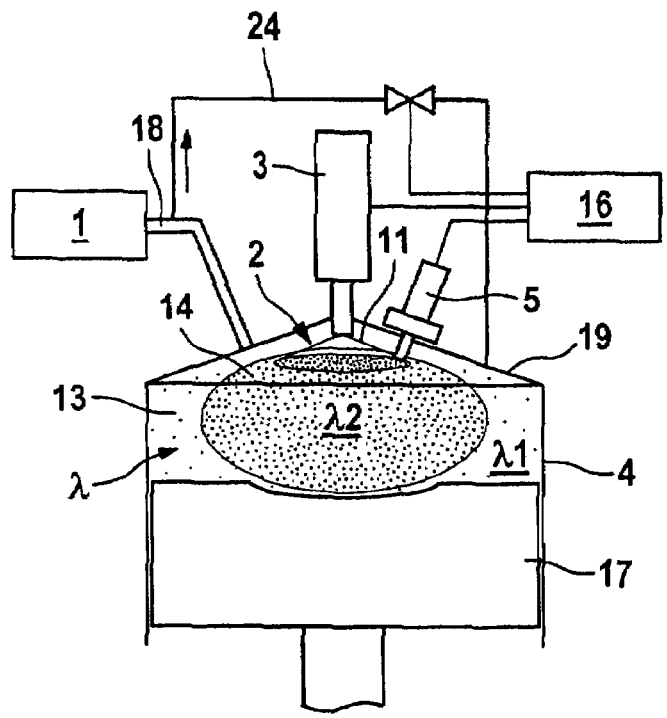
FIG. 5 shows the arrangement as per FIGS. 1 and 3 at full load with a lean homogeneous charge and a richer mixture cloud embedded therein.

FIGS. 1, 3 and 5 show schematically details of a first external-ignition, direct-injection 4-stroke internal combustion engine in the region of a cylinder 4 in different operating states. The first method according to the invention is presented on the basis of the example of the cylinder 4 shown here. The internal combustion engine can have one or more cylinders 4 with in each case one piston 17 which moves cyclically up and down therein. The cylinder 4 is closed off in its longitudinal direction, on the side opposite from the piston 17, by a cylinder head 19, with the interior space of said cylinder 4 being delimited in the opposite direction by the piston 17. The upward and downward movement of the piston 17 and control times, which are associated therewith, of inlet and outlet valves (not illustrated), serve to predefine a total of four process strokes of the internal combustion engine which take place one after the other in a cyclic sequence and which are described in more detail on the basis of FIGS. 2, 4 and 6.

In order to inject fuel 2 into the cylinder 4, an injector 3 is provided which is actuated by means of a schematically indicated control unit 16. The fuel 2 which is injected into the cylinder 4 forms, together with a fresh air volume sucked in an intake stroke 6 (FIGS. 2, 4 and 6), a fuel/air mixture which is ignited at a suitable time by a spark plug 5 which is arranged in the cylinder head 19. Corresponding to the schematic illustration as per FIGS. 1, 3 and 5, in addition to the injection by the injector 3, the ignition by the spark plug 5 is also controlled by means of the control unit 16, which brings about an ignition and combustion of the fuel/air mixture situated in the cylinder 4. The exhaust gas which is generated by the combustion is conducted out of the cylinder 4 by means of one or more outlet valves (not illustrated) through an exhaust-gas duct 18, and is, for aftertreatment, conducted through an exhaust-gas catalytic converter 1. The exhaust-gas catalytic converter 1 can be of any desired suitable design and is, in the exemplary embodiment shown, a three-way end-wall catalytic converter.

Figure 6:
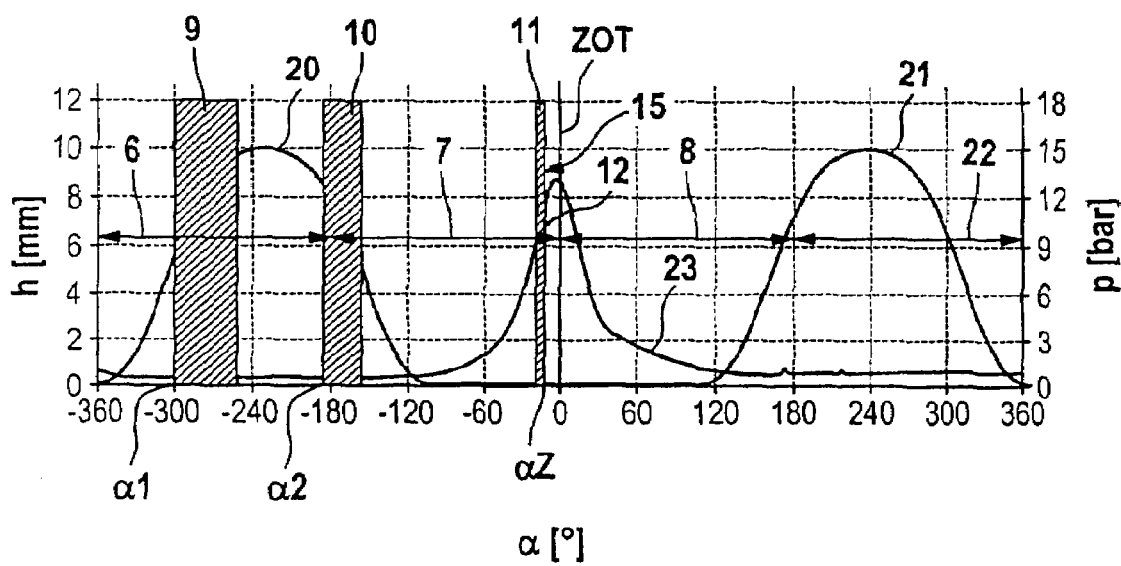
FIG. 6 shows a diagrammatic illustration of the injections which are carried out at different crank angles in the internal combustion engine as per FIG. 5 at full load.

In the method according to the invention for operating the spark-ignition internal combustion engine shown here, a total of three injections 9, 10, 11 of fuel 2 are carried out by means of the injector 3, which injections 9, 10, 11 are described in more detail in connection with FIGS. 2, 4 and 6. For this purpose, FIGS. 2, 4 and 6 show in each case a diagrammatic illustration of different individual progressions of the method according to the invention at different load states as a function of a crank angle $\alpha$ of a crankshaft (not illustrated) which defines the axial position of the piston 17 in the cylinder 4 (FIGS. 1, 3 and 5). A crank angle $\alpha$ of 0 defines an ignition top dead center ITDC, at which the inlet and outlet valves (not illustrated) are closed, and at which the piston 17 illustrated in FIG. 1, in its axial position closest to the cylinder head 19, has fully compressed the fuel/air mixture contained in the cylinder 4. In the region of the ignition top dead center ITDC, an ignition of the fuel/air mixture is carried out by means of the spark plug 5 (FIGS. 1, 3 and 5).

A first stroke of the 4-stroke process is an intake stroke 6 which extends over a crank angle range $\alpha$ from 360° to 180° before ignition top dead center ITDC. Said intake stroke 6 is followed by a compression stroke 7 which runs over a crank angle range $\alpha$ from 180° to 0° before ignition top dead center ITDC. Subsequently, a working stroke 8 runs from ignition top dead center ITDC with a crank angle $\alpha$ from 0° to 180°, which is followed by an outlet stroke 22 from 180° to 360° crank angle $\alpha$ after ignition top dead center ITDC. The end of the outlet stroke 22 at a crank angle $\alpha$ of 360° after ignition top dead center ITDC corresponds to the beginning of a subsequent intake stroke 6 at a crank angle $\alpha$ of 360° before ignition top dead center ITDC.

The inlet valves (not illustrated) perform a valve lift h corresponding to a curve 20 which extends for the most part over the intake stroke 6 and extends partially into the compression stroke 7. At a valve lift h of greater than 0 of the inlet valves, fresh air, if appropriate assisted by a supercharger, is sucked into the interior of the cylinder 4 (FIGS. 1, 3 and 5). A corresponding situation applies to the discharging of exhaust gases out of the cylinder 4, with a valve lift h of the outlet valves (not illustrated) being illustrated by a curve 21. Accordingly, the outlet valves are open substantially over the outlet stroke 22, with the opening of the outlet valves beginning already at the end of the working stroke 8. When the outlet valves are open, the exhaust gas which is generated is conducted through the exhaust-gas duct 18 indicated in FIG. 1 and through the exhaust-gas catalytic converter 1 which is connected downstream.

Under certain operating conditions, it can be expedient to provide a charge of the cylinder 4 with an increased quantity of inert gas. For this purpose, a schematically indicated exhaust-gas recirculation line 24 is provided which, under the action of the control unit 16, recirculates a predefined quantity of exhaust gas into the cylinder 4. An increased quantity of inert or exhaust gas can also be brought about by means of correspondingly set, if appropriate controlled or regulated, valve control times.

Viewing FIGS. 1 to 6 together reveals a first exemplary embodiment of the method according to the invention. Firstly, as a function of at least the load of the internal combustion engine, a crank angle $\alpha 1$ is determined at which a first injection 9 of fuel 2 takes place, by means of which a lean mixture 13 is generated in the cylinder 4. The local air ratio $\lambda 1$ of the lean mixture 13 is greater than 0 and is preferably selected such that a combustible but non-ignitable fuel/air mixture is generated. Subsequently, as a function of at least the load of the internal combustion engine, a crank angle $\alpha 2$ is determined at which a second injection 10 of fuel 2 takes place, by means of which a mixture cloud 14, which is richer than the lean mixture 13 and which is embedded in the lean mixture 13, is generated in the cylinder 4. A local air ratio $\lambda 2$, which is less than or equal to 1.0, prevails within the mixture cloud 14. The air ratio $\lambda 2$ of the mixture cloud 14 is selected such that a combustible and ignitable fuel/air mixture is generated in the mixture cloud 14. Subsequently, a third injection 11 of fuel 2 in the form of a stratified injection for generating a locally enriched and ignitable fuel/air mixture in the region of the spark plug 5 takes place at least close in terms of time to an ignition time 12.

For a more detailed explanation of the preferred embodiments of said method steps, FIGS. 1 and 2 show the method conditions at part-load, FIGS. 3 and 4 at low load and FIGS. 5 and 6 at high load or at full load. Accordingly, the three injections 9, 10, 11 are carried out in at least approximately the entire load range of the internal combustion engine. It can however also be expedient to carry out the method according to the invention only in particular load ranges.

FIGS. 1 and 2 show the method conditions at the usual, medium operating load. The first injection 9 is carried out as a homogeneous injection in the intake stroke 6, with the entire interior space of the cylinder 4 being filled at least approximately homogeneously with the lean mixture 13 in the subsequent compression stroke 7 shown in FIG. 1. The first injection 9 begins at a crank angle $\alpha 1$ of approximately 300° before ignition top dead center ITDC and extends over a time or a crank angle $\alpha$ which is necessary for introducing the required fuel quantity for obtaining the predefined air ratio λ1. It can be seen from the illustration as per FIG. 2 that the crank angle range of the first injection 9 is greater than that of the subsequent injections 10, 11; accordingly, the largest part of the total fuel quantity is injected in the first injection 9.

The second injection 10 takes place as a stratified injection in the compression stroke 7 and begins at a crank angle α2 of approximately 70° before ignition top dead center ITDC. The injection duration and therefore the injection quantity is less than that of the first injection 9, but greater than that of the third injection 11. This results in the generation of the mixture cloud 14 which is embedded into the lean mixture 13.

In contrast to the first two injections 9, 10, the time of the third injection 11 is coupled not to the crank angle α but rather to the ignition time 12 which varies with the rotational speed. The ignition time 12 is shown here by way of example at a crank angle αZ of approximately 15° before ignition top dead center ITDC, though can in particular assume some other position, in particular in a rotational-speed-dependent fashion with the third injection 11. It can in particular also be expedient, in cold-running operation in order to heat the exhaust-gas catalytic converter 1, to displace the ignition time 12 and the third injection 11 into the working stroke 8 after ignition top dead center ITDC.

The third injection 11 is designed in terms of its jet shape such that it is introduced into the mixture cloud 14 and here is conducted directly past the spark region of the spark plug 5. As a result of the direct temporal proximity of the third injection 11 to the ignition time 12, reliable ignition takes place in connection with the locally enriched mixture at the spark plug 5, which is transferred to the mixture cloud 14 and to the lean mixture 13.

In contrast to the part-load conditions as per FIGS. 1 and 2, at low engine loads corresponding to the illustrations as per FIGS. 3 and 4, all three injections 9, 10, 11 are carried out in the compression stroke 7 as stratified injections. Here, only small overall fuel quantities are required, as are shown by the ranges of crank angles α of the injections 9, 10, 11 illustrated in FIG. 4 in relation to those of the illustration as per FIG. 2 at part load. The first injection 9 is carried out at a crank angle α1 of approximately 60° before ignition top dead center ITDC and the second injection is carried out at a crank angle α2 of approximately 30° before ignition top dead center ITDC. The conditions at the third injection 11 and the ignition time 12 correspond approximately to those of the conditions of part load explained in connection with FIGS. 1 and 2.

The schematic illustration of FIG. 3 shows that, by designing the first injection 9 as a stratified injection in the compression stroke 7, the lean mixture 13 does not fill the entire cylinder volume. In this way, it is avoided that the low fuel quantity for the low load range can no longer be burned as a result of being distributed over an excessively large volume. The lean mixture 13 in fact forms a locally delimited cloud which, although not ignitable by means of the spark plug 5, is duly combustible. The richer mixture cloud 14 is embedded in said cloud of lean mixture 13. The ignition and flame propagation through the rich mixture cloud 14 and the lean mixture 13 otherwise correspond to part-load operation as per FIGS. 1 and 2.

FIGS. 5 and 6 show the conditions at full load. The stratified cylinder charge as per FIG. 5 substantially corresponds to the cylinder charge at part load as per FIG. 1. It can however be seen from FIG. 6 that the first injection 9 which is a homogeneous injection in the intake stroke 6 begins at a crank angle α1 of approximately 300° before ignition top dead center ITDC and, in order to provide a higher fuel quantity in relation to the illustration of FIG. 2, extends over a wider crank angle range α. The subsequent second injection 10 begins at a crank angle α2 of approximately 180° before ignition top dead center ITDC and likewise extends over a wider crank angle range α. The fuel quantity of the first injection 9 is selected such that the lean mixture 13, as a homogeneous background mixture, is still combustible, but at the same time, in order to set the required overall fuel quantity, also leaves a sufficient residual quantity for the two following injections 10, 11. The second injection 10 is selected such that the injected fuel quantity on the one hand remains in the direct vicinity of the spark plug, but on the other hand is so widely distributed that the fuel/air mixture generated in said region is approximately stoichiometric. The greater the fuel mass introduced into the combustion chamber as a second injection 10, therefore, the earlier its injection must take place in order to provide it with sufficient time for mixture preparation and distribution in the combustion chamber.

The third injection 11 corresponds in terms of its design to the third injection 11 as per FIGS. 1 to 4 at part load and at low load. In contrast thereto, it can merely be necessary, in order to take into consideration the higher combustion chamber pressure at higher loads, to possibly slightly increase the quantity of the third injection 11, since greater fuel quantities can be necessary for jet formation at higher combustion chamber pressures.

The illustrations as per FIGS. 1 to 6 show, by way of example, three different operating states at part load, low load and full load. Adaptations to intermediate operating parameters or load ranges can be carried out by means of the control unit 16 by means of in particular continuously variable displacement of the first and of the second injection 9, 10 with regard to time and injection quantity within the highlighted limits, as a result of which targeted adaptation to the load applied to the internal combustion engine is ensured.

In particular, it is expediently possible with the highlighted method for the internal combustion engine 1 to be utilized in the lean mode. For this purpose, the global air ratio λ averaged over the entire cylinder volume and generated from all the injections 9, 10, 11 is advantageously set in a range from approximately 1.0 inclusive to approximately 4.0 inclusive or greater. Alternatively, or in combination with this, it can be expedient to provide, by means of the above-described exhaust-gas recirculation 24 and/or by influencing the valve control times, an increased inert gas proportion in the cylinder volume at the beginning of the combustion.

Corresponding to the three exemplary illustrations as per FIGS. 2, 4 and 6, the three injections 9, 10, 11 are performed continuously over the specified crank angle range α. It can alternatively also be expedient to carry out one, a plurality or all of the injections 9, 10, 11 as double or triple injections if the design of the injector 3 permits this. For this purpose, a design of the injector 3 as a piezoelectric actuator can be expedient. By dividing the injection up into short individual injections which last only a few milliseconds, it is possible for the charge distribution or the later formation of the cylinder charge to be influenced in a targeted fashion.

In all the operating states shown, an injection end 15 of the third injection 11 is illustrated by way of example as lying in the region of the ignition time 12. It can also be expedient to place the injection end 15 in a crank angle range α from 0° to approximately 10° before the ignition time 12. In connection with the third injection 11 being carried out as a multiple injection, it can also be advantageous to carry out in each case one partial injection before and after the ignition time 12 in order to influence the ignition and the following combustion progression.

Figure 7:
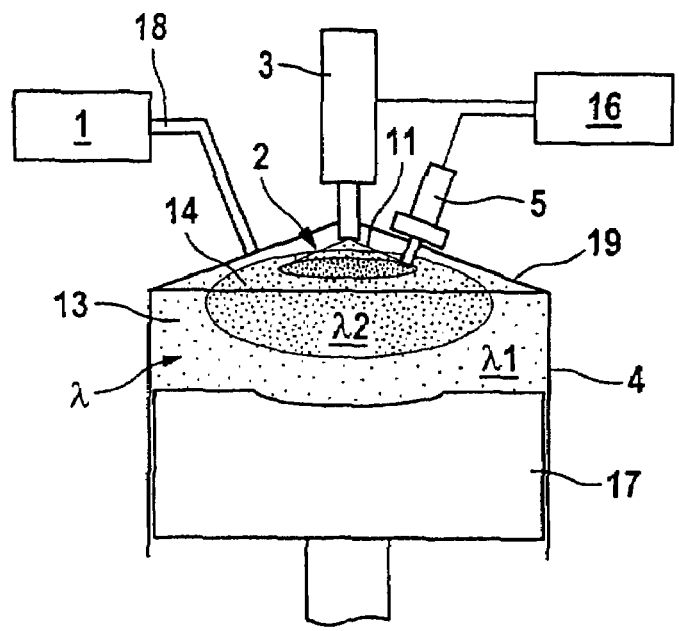
FIG. 7 shows schematically a second internal combustion engine in the region of an injector, a spark plug, a control unit and an exhaust-gas catalytic converter, with the cylinder being filled, as per the method according to the invention, with a different fuel/air mixture in different regions.

FIG. 7 shows, in a schematic illustration, a detail of a second spark-ignition, direct-injection 4-stroke internal combustion engine in the region of a cylinder 4. Equivalent elements and equivalent features are provided with the same reference symbols as in FIGS. 1 to 6. The second method according to the invention is in turn shown on the basis of the example of the cylinder 4 shown here. The internal combustion engine can have one or more cylinders 4 with in each case one piston 17 which moves cyclically up and down therein. The cylinder 4 is closed off in its longitudinal direction, on the side opposite from the piston 17, by a cylinder head 19, with the interior space of said cylinder 4 being delimited in the opposite direction by the piston 17. The upward and downward movement of the piston 17 and control times, which are coupled thereto, of inlet and outlet valves (not illustrated), serve to predefine a total of four process strokes of the internal combustion engine which take place one after the other in a cyclic sequence and which are described in more detail on the basis of FIG. 8.

In order to inject fuel 2 into the cylinder 4, an injector 3 is provided which is actuated by means of a schematically indicated control unit 16. The fuel 2 which is injected into the cylinder 4 forms, together with a fresh air volume sucked in an intake stroke 6 (FIG. 8), a fuel/air mixture which is ignited at a suitable time by a spark plug 5 which is arranged in the cylinder head 19. Corresponding to the schematic illustration as per FIG. 7, in addition to the injection by the injector 3, the ignition by the spark plug 5 is also controlled by means of the control unit 16. The ignition brings about an ignition and combustion of the fuel/air mixture situated in the cylinder 4. The exhaust gas which is generated from this is conducted out of the cylinder 4 by means of one or more outlet valves (not illustrated) through an exhaust-gas duct 18, and is, for aftertreatment, conducted through an exhaust-gas catalytic converter 1. The exhaust-gas catalytic converter 1 can be of any desired suitable design and is, in the exemplary embodiment shown, a three-way end-wall catalytic converter.

Figure 8:
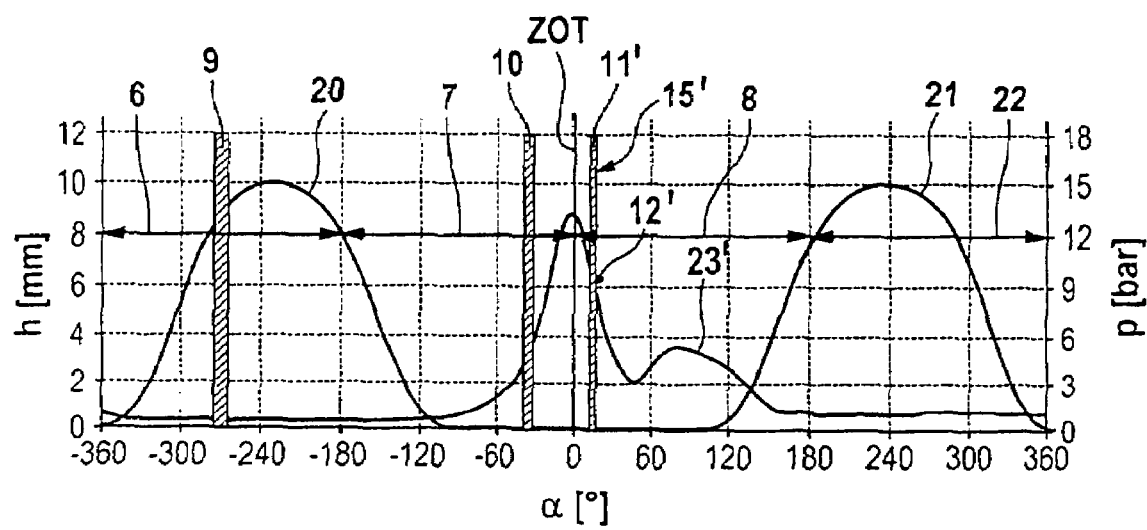
FIG. 8 is a diagrammatic illustration of the injections provided according to the invention at different crank angles in the internal combustion engine as per FIG. 7.

In the method according to the invention for the cold-running operation of the external-ignition internal combustion engine shown here, which cold-running operation extends over the time period from a cold start, at which the exhaust-gas catalytic converter 1, cylinder 4, piston 17 and cylinder head 19 are not yet at operating temperature, at least until that time at which the exhaust-gas catalytic converter 1 has reached its light-off temperature, a total of three injections of fuel 2 are carried out by means of the injector 3, which injections are described in more detail in connection with FIG. 8. For this purpose, FIG. 8 shows a diagrammatic illustration of different individual progressions of the second method according to the invention at different load states as a function of a crank angle α of a crankshaft (not illustrated) which defines the axial position of the piston 17 in the cylinder 4 (FIG. 7). A crank angle α of 0° defines an ignition top dead center ITDC at which the cylinder interior space contains an air/fuel mixture, at which the inlet and outlet valves (not illustrated) are closed, and at which the piston 17 illustrated in FIG. 7, in its axial position closest to the cylinder head 19, has compressed the fuel/air mixture present in the cylinder 4. In the region of ignition top dead center ITDC, an ignition of the fuel/air mixture is carried out by means of the spark plug 5 (FIG. 7).

A first stroke of the 4-stroke process is an intake stroke 6 which extends over a crank angle range α from 360° to 180° before ignition top dead center ITDC. Said intake stroke 6 is followed by a compression stroke 7 which extends over a crank angle range α from 180° to 0° before ignition top dead center ITDC. Subsequently, a working stroke 8 extends from ignition top dead center ITDC with a crank angle α from 0° to 180°, which is followed by an outlet stroke 22 from 180° to 360° crank angle α after ignition top dead center ITDC. The end of the outlet stroke 22 at a crank angle α of 360° after ignition top dead center ITDC corresponds to the beginning of a subsequent intake stroke 6 at a crank angle α of 360° before ignition top dead center ITDC.

The inlet valves (not illustrated) perform a valve lift h corresponding to a curve 20 which extends for the most part over the intake stroke 6 and extends partially into the compression stroke 7. At a valve lift h of greater than 0 of the inlet valves, fresh air, if appropriate assisted by a supercharger, is sucked into the interior of the cylinder 4 (FIG. 7). A corresponding situation applies to the discharging of exhaust gases out of the cylinder 4, with a valve lift h of the outlet valves (not illustrated) being illustrated by a curve 21. Accordingly, the outlet valves are open substantially over the outlet stroke 22, with the opening of the outlet valves beginning already at the end of the working stroke 8. When the outlet valves are open, the exhaust gas which is generated is conducted through the exhaust-gas duct 18 indicated in FIG. 7 and through the exhaust-gas catalytic converter 1 which is connected downstream.

With simultaneous reference to FIGS. 7 and 8, it is provided according to the second method according to the invention to carry out a first injection of fuel 2 into the interior of the cylinder 4 by means of the injector 3 in the intake stroke 6, as an intake stroke injection 9. In the exemplary embodiment shown, the intake stroke injection 9 is carried out here such that an at least approximately homogeneous lean mixture 13 with an air ratio $\lambda 1$ of approximately 1.6 is generated in the cylinder 4. The intake stroke injection 9 takes place at a crank angle α of approximately 260° before ignition top dead center ITDC. Here, the intake stroke injection 9 can be a single injection which takes place over a relatively long period of time. With a suitable design of the injector 3, for example of piezoelectric design, the intake stroke injection 9 can also be carried out as a multiple injection, in particular as a double or triple injection with short individual injections in the time range of a few milliseconds.

In the compression stroke 7 which follows the intake stroke 6, a second injection of fuel 2 is carried out as a compression stroke injection 10. The compression stroke injection 10, in the exemplary embodiment shown, lies at a crank angle α of approximately 30° before ignition top dead center and is carried out as a single injection which is spread over time. Similarly to the intake stroke injection 9, it is also possible to carry out a multiple injection.

The compression stroke injection 10 is, in the exemplary embodiment shown, carried out by means of the control unit 16 which acts on the injector 3 in such a way that, within the lean mixture 13, a mixture cloud 14 is formed which is richer than said lean mixture 13. The mixture cloud 14 is embedded in the lean mixture 13 of the intake stroke injection 9 and has a combustible and ignitable fuel/air mixture with an air ratio $\lambda 2$ of less than 1.0. The spatially delimited mixture cloud 14 which does not fill the cylinder 4 preferably does not extend far enough to reach cold wall components of the internal combustion engine such as the cylinder 4, the piston 17 or the cylinder head 19, but does extend as far as the spark region of the spark plug 5.

After the intake stroke injection 9 and the compression stroke injection 10, a third injection of fuel 2 takes place in the form of a stratified injection 11' which is designed in terms of its jet shape such that it is introduced into the mixture cloud 14 and here, extends directly past the spark region of the spark plug 5. It is also possible for the stratified injection 11' to be carried out, corresponding to the intake stroke injection 9 or compression stroke injection 10, as a single or multiple injection.

In contrast to the intake stroke injection 9 and the compression stroke injection 10, the time of the stratified injection 11 is coupled not to the crank angle $\alpha$ but rather to the time position of the ignition time 12'. Depending on the rotational speed and/or load of the internal combustion engine, the ignition time 12' can lie in the compression stroke 7 before ignition top dead center ITDC or in the working stroke 8 thereafter. The ignition time 12 expediently lies after ignition top dead center ITDC and in particular in a crank angle range $\alpha$ from 0° to 35°, preferably from 15° to 30° after ignition top dead center ITDC. The ignition time 12' is shown here by way of example at a crank angle $\alpha$ of approximately 20°. If the stratified injection 11' is carried out as a multiple injection, it can also be expedient to carry out in each case one individual injection shortly before and shortly after the ignition time 12'.

The stratified injection 11' occurs, in terms of time, shortly before the ignition time 12', with an injection end 15' of the stratified injection 11 being illustrated here by way of example as lying at the ignition time 12. The injection end 15' expediently lies in a range from 0° to 10°crank angle $\alpha$ before the ignition time 12'. The late ignition, which lies after ignition top dead center ITDC, at the ignition time 12', takes place when the cylinder pressure p is falling, illustrated by a curve 23'.

The stratified injection 11 generates a fuel/air mixture which is locally enriched in the region of the spark plug 5 and which can be easily and reliably ignited directly adjacently in terms of time despite the relatively late ignition time 12'. The fuel quantity of the stratified injection 11', which is only very small in relation to the intake stroke injection 9 and in relation to the compression stroke injection 10, serves here merely for reliable ignition, and otherwise contributes to the rich air ratio $\lambda 2 < 1.0$ in the mixture cloud 14. All the injections 9, 10, 11' are coordinated with one another in terms of their respective quantity of fuel 2 in such a way that a lean mixture is duly formed locally in the lean mixture 13 of the intake stroke injection 9 and a rich mixture is generated in the mixture cloud 14. Averaged over the entire volume of the cylinder interior space, however, a global air ratio $\lambda$ is formed which is stoichiometric ($\lambda=1$) or slightly lean ($\lambda<1$). The global air ratio $\lambda$ preferably lies in a range between 1.0 inclusive and 1.05 inclusive.

The stratified injection 11' ensures reliable ignition of the mixture cloud 14 even at a very late ignition time 12' and when components of the internal combustion engine are cold, while the homogeneous lean mixture 13 prevents excessive accumulation of fuel 2 on cold engine components. At the same time, the total quantity of fuel/air mixture in the cylinder 4 is not fully burned when the outlet valves are opened corresponding to the curve 21, in particular in the region of the lean mixture 13. Unburned proportions are conducted through the exhaust-gas duct 18 and the exhaust-gas catalytic converter 1. The approximately stoichiometric or slightly lean global air ratio $\lambda 0$ permits, without further measures, a thermal post-combustion in the region of the exhaust-gas duct 18 situated between the cylinder head 19 and the exhaust-gas catalytic converter 1 and also in the exhaust-gas catalytic converter 1 itself, as a result of which the latter is heated up very quickly from the cold state to the so-called light-off temperature, at which the catalytically converting action of the exhaust-gas catalytic converter comes into effect.

The injection quantities of the compression stroke injection 10 and/or of the stratified injection 11' are controlled or regulated in coordination with the rising temperature, in particular in the region of the exhaust-gas catalytic converter 1, during the cold-running operation. In addition, the times of the compression stroke injection 10, and/or the ignition time 12' and the stratified injection 11' which is coupled to the ignition time 12, are controlled or regulated by means of the control unit 16. Said control or regulation can also relate to the sequence of multiple injections in order to form the individual injections 9, 10, 11'. It is in particular provided to move the compression stroke injection 10 from a crank angle $\alpha$ of approximately 30° before ignition top dead center ITDC to a crank angle $\alpha$ of approximately 210° to 230° before ignition top dead center ITDC. At the same time, the initially late injection time 12 and the stratified injection 11', which is coupled thereto, are displaced to an earlier time in particular before ignition top dead center ITDC.

As an assistive measure for the thermal post-combustion, it is also possible for a secondary injection of air into the exhaust-gas duct 18 to take place, thereby further accelerating the heating of the exhaust-gas catalytic converter 1. It can likewise be expedient to provide an additional injection after the stratified injection 11' and the ignition time 12', which additional injection is, as a function of operating point, coupled either to the ignition time 12' or to the crank angle $\alpha$, and by means of which additional injection additional chemical energy is introduced into the exhaust gas and therefore to the exhaust-gas catalytic converter 1 for accelerated heating of the latter.

The illustrated methods for optimizing the operation of a spark-ignition internal combustion engine can be combined with one another in an obvious way, that is to say can in particular be executed in parallel in one internal combustion engine. Here, it is possible for different methods and/or different method steps to be assigned simultaneously to different cylinders or combustion chambers. It is likewise possible for the different methods to be assigned to different load or temperature ranges of the internal combustion engine. In particular, the second method is to be assigned to a respective cold-start time, while the first method can be assigned to cold-start operation and/or nominal-temperature operation of the internal combustion engine.

What is claimed is:

1. A method for operating a spark-ignition, direct-injection internal combustion engine having a cylinder (4) with a piston (17) and a cylinder head (19) with a fuel injector (3) and a spark plug (5), wherein fuel (2) is injected by means of an injector (3) into the cylinder (4) of the internal combustion engine and is ignited by means of the spark plug (5), said method comprising the steps of:

determining as a function of at least the load of the internal combustion engine, a crank angle ($\alpha 1$) at which a first injection (9) of fuel (2) takes place, and performing the first injection whereby a lean mixture (13), whose local air ratio ($\lambda 1$) is greater than 1.0, is generated in the cylinder (4);

subsequently, determining as a function of at least the load of the internal combustion engine, a crank angle ($\alpha 2$) at which a second injection (10) of fuel (2) takes place, and initiating a second injection whereby a mixture cloud (14) is formed, which is richer than the lean mixture (13) of the first injection and which is embedded in the lean mixture (13) and whose local air ratio ($\lambda 2$) is less than or equal to 1.0, is generated in the cylinder (4);

subsequently, initiating a third injection (11) of fuel (2) in the form of a stratified injection for generating a locally enriched and ignitable fuel/air mixture in the region of the spark plug (5) at least close in terms of time to an ignition time (12) and igniting the locally enriched fuel/air mixture.

2. The method as claimed in claim 1, wherein the three injections (9, 10, 11) are carried out in at least approximately the entire load range of the internal combustion engine.

3. The method as claimed in claim 1, wherein at low engine load, the first and the second injection (9, 10) takes place as a stratified injection in a compression stroke (7).

4. The method as claimed in claim 3, wherein the first injection (9) is carried out at a crank angle ($\alpha 1$) of approximately 60° before ignition top dead center (ITDC) and the second injection (10) at a crank angle ($\alpha 2$) of approximately 30° before ignition top dead center (ITDC).

5. The method as claimed in claim 1, wherein, at least at one of medium and high engine load, the first injection (9) is a homogeneous injection in an intake stroke (6), and the second injection (10) is a stratified injection in the compression stroke (7).

6. The method as claimed in claim 5, wherein, at medium engine load, the first injection (9) begins at a crank angle ($\alpha 1$) of approximately 300° before ignition top dead center (ITDC) and the second injection (10) begins at a crank angle ($\alpha 2$) of approximately 60° before ignition top dead center (ITDC).

7. The method as claimed in claim 5, wherein, at high load, the first injection (9) begins at a crank angle ($\alpha 1$) of approximately 300° before ignition top dead center (ITDC) and the second injection (10) begins at a crank angle ($\alpha 2$) of approximately 180° before ignition top dead center (ITDC).

8. The method as claimed in claim 1, wherein the air ratio ($\lambda 1$) of the lean mixture (13) is selected such that a combustible but non-ignitable fuel/air mixture is generated.

9. The method as claimed in claim 1, wherein the air ratio ($\lambda 2$) of the mixture cloud (14) formed by the second injection is selected such that a combustible and ignitable fuel/air mixture is generated.

10. The method as claimed in claim 1, wherein a global air ratio ($\lambda$) averaged over the cylinder volume and generated from all the injections (9, 10, 11) is in a range from approximately 1.0 inclusive to approximately 4.0 inclusive.

11. The method as claimed in claim 1, wherein the cylinder volume contains a proportion of inert gas at the beginning of the combustion.

12. The method as claimed in claim 1, wherein at least one of the injections (9, 10, 11) is carried out as a multiple injection, in particular as a double or triple injection.

13. The method as claimed in claim 1, wherein the third injection is coordinated in terms of time with the ignition time (12).

14. The method as claimed in claim 13, wherein the third injection has an injection end (15) in the region of the ignition time (12).

15. A method of operating a spark-ignition, direct-injection internal combustion engine which operates on the 4-stroke principle and has an exhaust-gas catalytic converter (1) during cold-running operation, in which fuel (2) 2s injected by means of an injector (3) into a cylinder (4) of the internal combustion engine and is ignited by means of a spark plug (5), which method comprises the following steps:
performing in an intake stroke (6), a first injection of fuel (2) as an intake stroke injection (9), in which a lean, combustible but non-ignitable lean mixture (13) is generated in the cylinder (4);
performing in a compression stroke (7) which follows the intake stroke (6), a second injection of fuel (2) as a compression stroke injection (10), in which a combustible and ignitable fuel/air mixture is generated in the cylinder;
subsequently, performing a third injection of fuel (2) in the form of a stratified injection (11') for generating a locally enriched and ignitable fuel/air mixture in the region of the spark plug (5) at least close in terms of time to an ignition time (12'), and igniting the locally enriched and ignitable fuel/air mixture of the third injection.

16. The method as claimed in claim 15, wherein the intake stroke injection (9) is carried out in such a way that an at least approximately homogeneous lean mixture (13) is generated in the cylinder (4).

17. The method as claimed in claim 16, wherein the homogeneous lean mixture (13) has an air ratio ($\lambda 1$) of approximately 1.6.

18. The method as claimed in claim 15, wherein the compression stroke injection (10) is carried out in such a way that, within the homogeneous lean mixture (13), a mixture cloud (14) is formed which is richer than said homogeneous lean mixture (13).

19. The method as claimed in claim 18, wherein the richer mixture cloud (14) has an air ratio ($\lambda 2$) of less than 1.0.

20. The method as claimed in claim 15, wherein the global air ratio ($\lambda$) averaged over the cylinder volume and generated from all the injections (9, 10, 11') is in a range from approximately 1.0 inclusive to greater than 1.0, and is in particular between 1.0 inclusive and 1.05 inclusive.

21. The method as claimed in claim 15, wherein at least one of the intake stroke injection (9), the compression stroke injection (10) and the stratified injection (11') is carried out as a multiple injection.

22. The method as claimed in claim 15, wherein the intake stroke injection (9) takes place at a crank angle ($\alpha$) of approximately 260° before ignition top dead center (ITDC).

23. The method as claimed in claim 15, wherein the compression stroke injection (10) takes place at a crank angle ($\alpha$) of approximately 30° before ignition top dead center (ITDC).

24. The method as claimed in claim 15, wherein the stratified injection (11') is coordinated in terms of time with the ignition time (12').

25. The method as claimed in claim 24, wherein the ignition time (12') lies after ignition top dead center (ITDC) and in a crank angle range ($\alpha$) of 0° to 35°, after ignition top dead center (ITDC).

26. The method as claimed in claim 24, wherein an injection end (15') of the stratified injection (11') coincides with the ignition time (12').

27. The method as claimed in claim 15, wherein the injection quantities of at least one of the compression stroke injection (10) and the stratified injection (11') are controlled by a control unit (16) as a function of an operating temperature of the exhaust-gas catalytic converter (1).

28. The method as claimed in claim 15, wherein the times of at least one of the compression stroke injection (10), the ignition (12') and the stratified injection (11') which is coupled to the ignition time (12') are controlled by means of the control unit (16) as a function of the operating temperature of the exhaust-gas catalytic converter (1).

* * * * *